United States Patent [19]

Brehob et al.

[11] Patent Number: 5,578,748

[45] Date of Patent: Nov. 26, 1996

[54] METHOD AND SYSTEM FOR CALCULATING EFFECTIVE FUEL ECONOMY

[75] Inventors: Diana D. Brehob; Todd A. Kappauf, both of Dearborn, Mich.

[73] Assignee: Ford Motor Company, Dearborn, Mich.

[21] Appl. No.: 533,144

[22] Filed: Sep. 25, 1995

Related U.S. Application Data

[63] Continuation of Ser. No. 247,188, May 20, 1994, abandoned.

[51] Int. Cl.⁶ .............................. G01F 9/00; G01M 15/00
[52] U.S. Cl. .............................................. 73/114; 364/442
[58] Field of Search ......................... 73/112, 113, 114; 364/442

[56] References Cited

U.S. PATENT DOCUMENTS

| | | | |
|---|---|---|---|
| 3,589,176 | 6/1971 | Wellons | 73/113 |
| 3,812,710 | 5/1974 | Baumer et al. | 73/114 |
| 3,930,408 | 1/1976 | Kadota | 73/114 |
| 3,977,238 | 8/1976 | Byington, Jr. | 73/114 |
| 3,998,094 | 12/1976 | Martin | 73/114 |
| 4,007,634 | 2/1977 | Alban | 73/114 |
| 4,012,949 | 3/1977 | Lanz | 73/114 |
| 4,046,998 | 9/1977 | Kuno et al. | 235/150.21 |
| 4,112,492 | 9/1978 | Summers | 73/114 |
| 4,157,030 | 6/1979 | Keely | 73/113 |
| 4,160,376 | 7/1979 | Borkan | 73/114 |
| 4,217,644 | 8/1980 | Kato et al. | 364/442 |
| 4,218,744 | 8/1980 | Pratt et al. | 73/114 |
| 4,372,155 | 2/1983 | Butler et al. | 73/114 |
| 4,400,779 | 8/1983 | Kosuge et al. | 364/442 |
| 4,492,112 | 1/1985 | Igarashi et al. | 73/114 |
| 4,553,032 | 11/1985 | Lo et al. | 73/113 |
| 4,564,905 | 1/1986 | Masuda et al. | 364/424 |
| 4,663,718 | 5/1987 | Augello et al. | 364/444 |
| 4,706,083 | 11/1987 | Baatz et al. | 340/825.06 |
| 4,845,630 | 7/1989 | Stephens | 364/442 |

OTHER PUBLICATIONS

Davis, *Classical Mechanics*, Academic Press, pp. 282–313, 1986.

*Primary Examiner*—Richard Chilcot
*Assistant Examiner*—George M. Dombroske
*Attorney, Agent, or Firm*—Richard D. Dixon; Roger L. May

[57] ABSTRACT

A method and system for calculating the effective fuel economy of a fuel-consuming engine in a vehicle are disclosed. The effective fuel economy is calculated taking into consideration the chemical energy contained in the fuel and the change in kinetic energy of the vehicle (42). The effective fuel economy is also calculated by further considering the change in potential energy of the vehicle (60). The chemical energy contained in the fuel is determined by sensing the mass flow rate of fuel (52). The kinetic energy (56) is determined by sensing the change in the speed of the vehicle and the mass of the vehicle (50). The potential energy (58) is determined by sensing the change in elevation of the vehicle (50). The effective fuel economy is displayed to the operator of the vehicle (64).

20 Claims, 5 Drawing Sheets

METHOD AND SYSTEM FOR CALCULATING EFFECTIVE FUEL ECONOMY

This is a continuation of application Ser. No. 08/247,188, filed on May 20, 1994, now abandoned.

TECHNICAL FIELD

This invention relates to a method and system for calculating the fuel economy of a vehicle and more particularly to a method and system for calculating a fuel economy which is corrected for changes in the chemical energy of the fuel, changes in the kinetic energy of the vehicle, and changes in the potential energy thereof.

BACKGROUND ART

It is known in the art to measure engine fuel economy based on average vehicle speed and the average fuel flow over an interval of time. This type of measured fuel economy considers fuel energy to be the only type of energy associated with the vehicle. In reality, the vehicle can also store or consume kinetic and/or potential energy. The chemical energy stored in the fuel may be converted into kinetic energy which may be used later during a coast down.

In vehicles with deceleration fuel shutoff, prior art methods of determining fuel economy indicate that fuel economy is infinite during deceleration. However, the fuel energy stored as kinetic energy during the acceleration phase is now being consumed. Furthermore, the prior art does not distinguish between braking and coasting, both of which may indicate infinite fuel efficiency.

A method and apparatus for calculating corrected vehicle fuel economy is disclosed in U.S. Pat. No. 4,845,630, issued to Stephens. The method includes calculating the distance travelled by the vehicle, the fuel consumed by the engine, and the change of the kinetic energy of the vehicle. The change of kinetic energy is compensated by a weighting factor that modifies the kinetic energy term to account for the fuel that would be used at real engine and drive train efficiencies, which can only be determined experimentally. Therefore, the weighting factor must be predetermined and stored in a read-only memory. This system does not to consider the potential energy of the vehicle.

The known prior art does not disclose a method of calculating fuel economy which balances the chemical energy contained in the fuel, and the kinetic and potential energy of the vehicle. In the prior art, a weighting factor is employed which takes into account that in converting chemical energy of the fuel into the shaft output, the efficiency is usually less than 25%. In comparison, potential energy can be converted into kinetic energy at a much higher efficiency. Therefore, the present invention calculates fuel economy based on an energy balance over the vehicle as a whole.

DISCLOSURE OF THE INVENTION

It is thus a general object of the present invention to provide a method and system for calculating the effective fuel economy ($MPG_{eff}$) by considering the chemical energy of the fuel and kinetic energy of a vehicle.

A further object of the present invention is to provide a method and system for calculating the $MPG_{eff}$ by considering potential energy of the vehicle in addition to chemical energy of the fuel and kinetic energy of the vehicle.

In carrying out the above objects, the present invention provides a method for calculating and displaying $MPG_{eff}$. The amount of chemical energy contained in the fuel is calculated. Vehicle speed is sensed over a predetermined interval of time and a velocity signal representative thereof is generated. The change in kinetic energy of the vehicle over the interval of time is calculated based on the velocity signals and the vehicle's mass. Effective fuel economy is calculated based on the amount of chemical energy contained in the fuel and the change in kinetic energy. The effective fuel economy is then displayed to the operator of the vehicle.

In addition, the amount of potential energy of the vehicle is calculated. The $MPG_{eff}$ is then calculated based on the amount of chemical energy contained in the fuel, the change in kinetic energy and the change in potential energy.

BRIEF DESCRIPTION OF THE DRAWINGS

The present invention will be apparent from the detailed description taken in conjunction with the accompanying drawings in which.

BEST MODES FOR CARRYING OUT THE INVENTION

Figure 1:
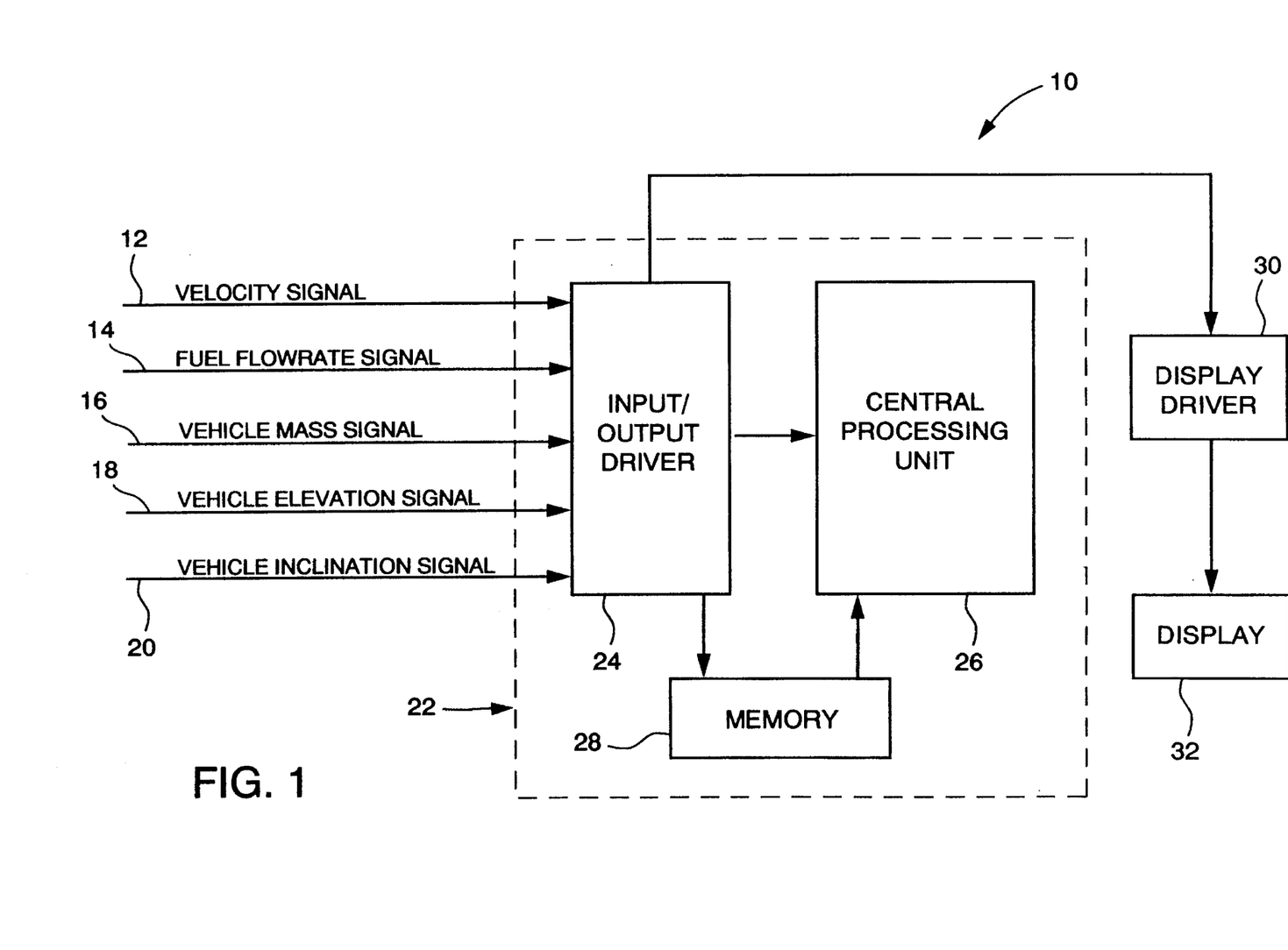
FIG. 1 is a schematic block diagram of a system for measuring and displaying effective fuel economy made in accordance with the teachings of the preferred embodiment of this invention.

A system for calculating and displaying the effective fuel economy of a fuel-consuming engine in a vehicle is illustrated generally as reference numeral 10 in FIG. 1. The system utilizes several signals, including a velocity signal 12, a fuel flow rate signal 14, a vehicle mass signal 16, a vehicle elevation signal 18, and/or a vehicle inclination signal 20. These signals are coupled to the input/output driver 24, which is included in a microcontroller assembly, shown generally as 22. Preferably, the microcontroller assembly 22 is integrated into the vehicle's electronic engine control system. Alternatively, the microcontroller 22 may be a separate, stand-alone unit. The microcontroller 22 includes a central processing unit 26 and a memory 28, including pre-programmed read-only memory (ROM).

The velocity signal 12 is generated by a vehicle speed sensor which may be either coupled to the transmission of the vehicle drivetrain or to one of the wheels of the vehicle in order to develop a signal representative of the distance travelled and the speed of the vehicle. Any conventional speed sensor may be suitable for application in the present invention.

The fuel flow rate signal 14 is representative of the fuel flowing from the fuel tank and into the engine of the vehicle. The fuel flow rate signal 14 can be generated in a number of ways, including either sensing the fuel quantity consumed by the engine or, as used in the preferred embodiment, by generating a signal representative of the fuel actually injected into the combustion chambers of the engine. Such a signal typically is generated by the electronic engine control system in the form of digital pulses in which the frequency is proportional to the fuel flow rate into the engine. This method of generating the fuel flow rate signal 14 is very accurate and is normally available from existing vehicle electronic systems such as the electronic engine control system.

The input/output 24 of microcontroller 22 is coupled to a display driver 30. The display driver 30 controls a visual display 32 for displaying the calculated effective fuel economy. The visual display may take the form of a vacuum fluorescent display, on LED display, an LCD display or even an analog display.

Currently, instantaneous fuel economy is calculated as follows:

$$MPG = \frac{v \times D}{m_f}$$

where v indicates the vehicle speed, D indicates the density of the fuel, and $m_f$ indicates the mass flow rate of fuel. The vehicle speed is provided by the velocity signal 12 as previously explained. The density of gasolines is quite constant, independent of type or grade. Therefore, the density can be fixed at 0.72 g/cc. The mass flow rate of fuel is calculated as follows:

$$m_f = K(fpc_i - fpc_{i-1})$$

where K is the mass of fuel supplied per pulse as indicated by the fuel flow rate signal 14, and $fpc_i$, $fpc_{i-1}$ are the fuel pulse counter readings over a predetermined interval of time, $t_{i-1}$ to $t_i$. The subscript "i" indicates the current value and the subscript "i−1" indicates the value at the previous time step. The vehicle's computer sends a pulse to the microcontroller 22 each time a certain quantity, K, of fuel has been consumed. The average fuel economy over an interval of time is computed as follows:

$$MPG_i = \frac{v_{avg} \times D}{[m_f/(t_i - t_{i-1})]}$$

where the subscript "avg" indicates the average over the time period and $m_f$ is the amount of fuel delivered to the engine between pulses.

The preceding algorithm can be rewritten as follows:

$$MPG = \frac{v_{avg} \times D \times \Delta t}{m_f}$$

where $\Delta t$ is a shorthand notation for $t_i - t_{i-1}$. Multiplying the numerator and denominator by $\Delta H_R$, the enthalpy of reaction of the fuel, gives:

$$MPG = \frac{v_{avg} \times D \times \Delta t \times \Delta H_R}{m_f \times \Delta H_R}.$$

The enthalpy of reaction of the fuel, $\Delta H_R$, represents the energy released per unit mass from the combustion process.

The enthalpy of reaction of the fuel depends on the fuel type. It is relatively insensitive to gasoline grade; thus a constant value of $\Delta H_R$, approximately 43 kJ/gm, is sufficient. However, flexible fuel vehicles, vehicles that allow a range of fuels from 100% gasoline to 100% alcohol, consume fuels for which $\Delta H_R$ varies considerably. In this case, a conventional vehicle on-board sensor is required for measuring the fuel type. The enthalpy of reaction of the fuel would then be determined by the following equation:

$$\Delta H_{R,mix} = [X_{alcohol} \times \Delta H_{R,alcohol}] + [(1 - X_{alcohol}) \times \Delta H_{R,gasoline}]$$

where the mixture's enthalpy of reaction is based on the mass fraction of alcohol multiplied by the enthalpy of reaction of alcohol plus the mass fraction of gasoline (indicated as one minus the fraction that is alcohol) multiplied by the enthalpy of reaction of gasoline.

The mass of fuel multiplied by the enthalpy of reaction of fuel equals the amount of chemical energy contained in the fuel, which allows for the substitution as follows:

$$MPG = \frac{v_{avg} \times D \times \Delta t \times \Delta H_R}{E_f}$$

where $E_f$ is energy contained in the fuel.

The preceding algorithm considers fuel energy to be the only type of energy associated with the vehicle. In reality, the vehicle can also store or consume kinetic and/or potential energy. Kinetic energy is associated with motion. A vehicle which is moving has energy associated with it. If no further motive force (i.e., no power from the engine) is applied, the energy which the vehicle possesses, by virtue of its velocity, can be expended to push air out of its path to continue moving or to ascend an incline, i.e., changing the kinetic energy to potential energy.

Potential energy is the amount of energy that matter has because of its position. A vehicle placed at the top of a hill has an energy associated with it called potential energy. On an incline, that energy can be converted into kinetic energy by removing the brake. The vehicle will roll down the hill. In contrast, a vehicle at the bottom of the hill contains no potential energy, i.e., it cannot move by virtue of gravity's action upon it. Instead, a force must be applied on the vehicle to cause it to move.

To assist a driver in operating a vehicle in a more efficient manner, the consideration of energy should be broadened to include at least kinetic energy. The effective fuel economy can then be calculated taking into consideration the change in the kinetic energy of the vehicle. The $MPG_{eff}$ output signal representative of the effective fuel economy can then be calculated as follows:

$$MPG_{eff} = \frac{v_{avg} \times D \times \Delta t \times \Delta H_R}{E_f - \Delta E_{KE}}$$

where the subscript KE indicates the kinetic energy contribution.

Alternatively, the change in potential energy of the vehicle as well as the change in the kinetic energy of the vehicle should be considered to assist an operator in the most efficient manner. The $MPG_{eff}$ output signal would then be calculated as follows:

$$MPG_{eff} = \frac{v_{avg} \times D \times \Delta t \times \Delta H_R}{E_f - \Delta E_{KE} - \Delta E_{PE}}$$

where the subscript PE indicates the potential energy contribution. Therefore, the chemical energy contained in the fuel, the change in kinetic energy of the vehicle, and the change in potential energy of the vehicle are weighted equivalently and the energy is balanced over the vehicle as a whole.

The change in kinetic energy is represented by the following formula:

$$\Delta E_{KE} = \frac{1}{2} \times m \times (v_i^2 - v_{i-1}^2)$$

where m is the mass of the vehicle plus occupants, cargo, and towing load. The mass of the vehicle changes as its occupant(s), carrying load, or towing load changes. The mass of the vehicle can be provided by a vehicle mass signal 16 which is determined by sensing the mass of the vehicle via a weighing device mounted on the vehicle itself. For example, on a vehicle having ride elevation control consisting of a pressurized air system, the air pressure could be measured with a pressure transducer and then related to vehicle mass based on a previously determined look-up table. For practical purposes, the mass of the vehicle can be fixed at a reasonable average estimate, e.g., the vehicle mass plus two 180 lb. occupants.

The change in potential energy is represented by the following formula:

$$\Delta E_{PE} = m \times g \times [h_i - h_{i-1}]$$

where g is the acceleration due to gravity, 9.81 m/sec$^2$, and $h_i - h_{i-1}$ is the difference in elevation of the vehicle. This equation requires knowledge about the altitude of the vehicle. Preferably, a commercially available navigation device used presently in vehicles is utilized to provide the vehicle elevation signal 18 necessary to determine the change in potential energy of the vehicle. The navigation device communicates with satellites or transmitters located throughout the United States. Based on information obtained from the transmitters, the navigation device can determine the vehicle's position, and hence its elevation, using known position determining methods, such as, for example, hyperbolic trilateration techniques. In the alternative, an altimeter adapted to meet the requirements of a vehicle application may be used to provide the necessary vehicle altitude.

Alternatively, the change in potential energy can be computed based on the vehicle's inclination angle as follows:

$$\Delta E_{PE} = m \times g \times v_{avg} \times \Delta t \times \sin(\emptyset)$$

where $\emptyset$ is the angle of attack (pitch) of the vehicle with respect to a horizontal. An inclinometer installed on the vehicle would then provide the vehicle inclination signal 20 necessary to determine the change in potential energy. In the preferred embodiment, an HGM Type B 12/200 accelerometer is used.

Figure 2:
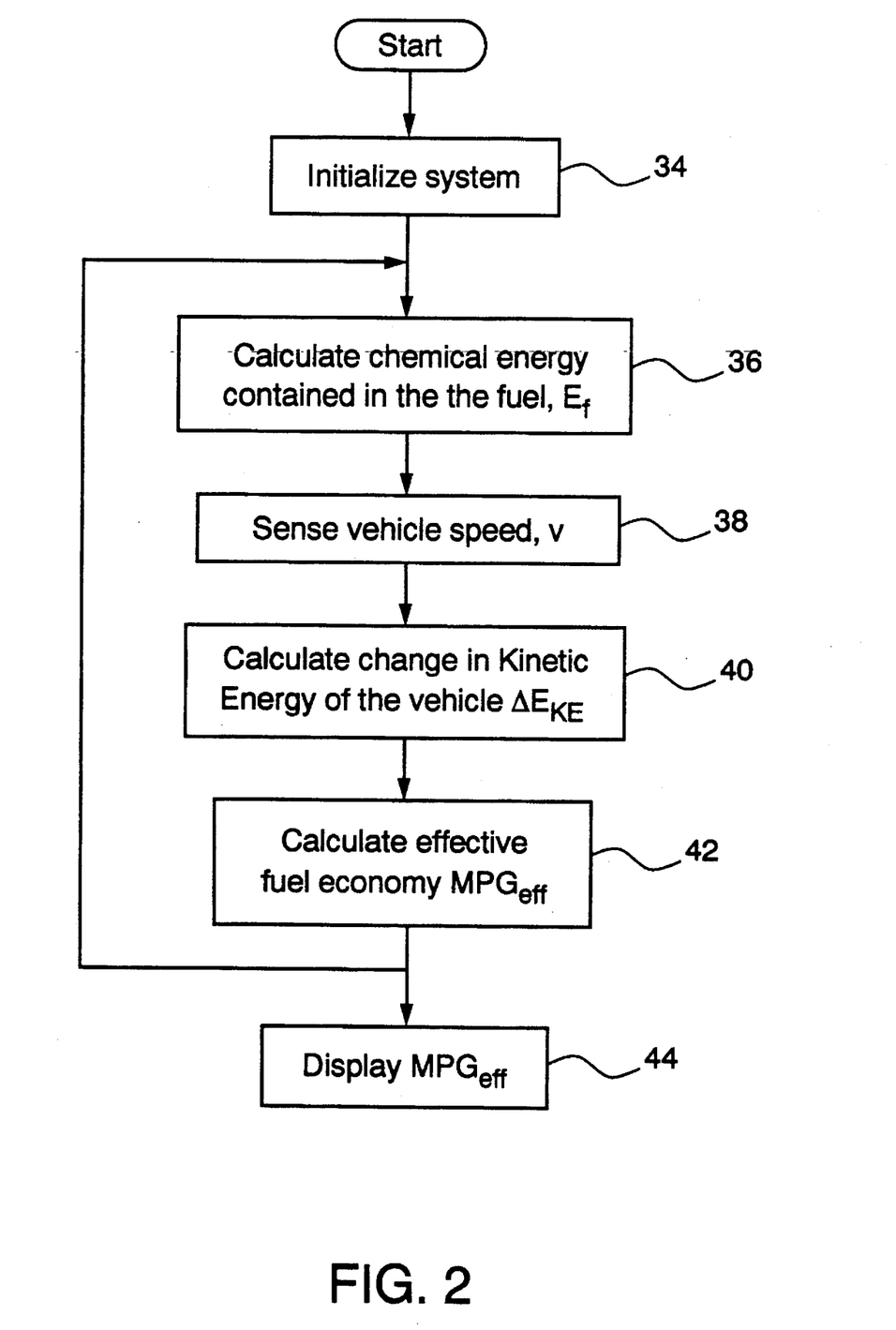
FIG. 2 is a functional block diagram of the method utilized in accordance with the present invention.

The general steps utilized by the microcontroller 22 in the method of calculating and displaying the effective fuel economy of a fuel-consuming engine in a vehicle during an interval of time is shown in FIG. 2. First, the system is initialized, as shown in step 34. The amount of chemical energy contained in the fuel, $E_f$ is then calculated, as shown in step 36. Step 38 includes sensing the vehicle speed in order to generate a corresponding velocity signal. The change in kinetic energy of the vehicle, $\Delta E_{KE}$, is then calculated as shown in step 40.

The effective fuel economy, MPG$_{eff}$, can then be calculated, as shown in step 42 based on the chemical energy and the change in kinetic energy. Finally, as shown in step 44, the effective fuel economy, MPG$_{eff}$, is then displayed to the operator of the vehicle. Steps 36–42 are continuously repeated in order to provide the operator of the vehicle with current effective fuel economy.

Figure 3:
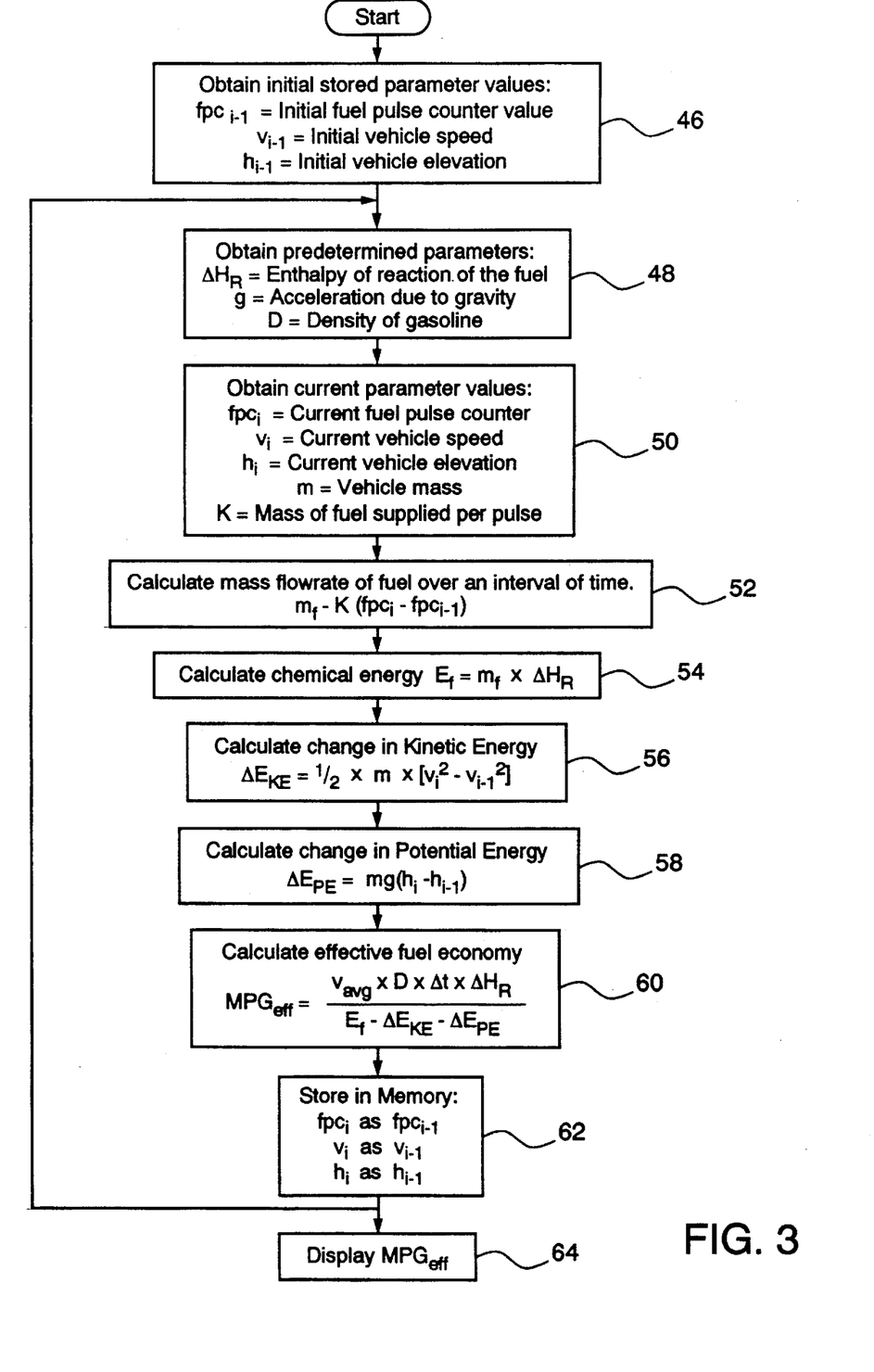
FIG. 3 is a detailed block diagram illustrating the sequence of steps performed in the method of the present invention.

The sequence of steps performed in the method of the present invention are detailed in FIG. 3. Step 46 represents the initialization of the method of the present invention. Step 46 includes obtaining initial parameter values, such as the initial value of the fuel pulse counter, fpc$_{i-1}$, the initial speed of the vehicle, $v_{i-1}$, and the initial elevation of the vehicle, $h_{i-1}$. The second step 48 includes obtaining predetermined parameters, such as the enthalpy of reaction of the fuel, $\Delta H_R$, and the acceleration due to gravity, g, and the density of gasoline, D, from the memory 28 of microcontroller 22.

At step 50, the current parameter values are obtained, including the current fuel pulse counter fpc$_i$, the current vehicle speed, $v_i$, the current vehicle elevation, $h_i$, the vehicle mass, m, and the mass of fuel supplied per pulse, K. The vehicle mass can either be sensed to provide the vehicle mass signal 16, or the vehicle mass can be a predetermined parameter stored in the ROM of the memory 28.

The elevation of the vehicle is sensed to provide a vehicle elevation signal 18. This is accomplished using a commercially available navigation device installed on the vehicle which can determine the vehicle's elevation, as previously described. By finding the difference between the sensed altitude of the vehicle at time i and that at time i–1, the change in elevation can be calculated.

The fuel consumed over the interval of time is used to obtain the mass of fuel, $m_f$, as shown in step 52.

The chemical energy contained in the fuel is then calculated, as shown in step 54, based on the following equation:

$$E_f = m_f \times \Delta H_R.$$

The change in kinetic energy of the vehicle is then calculated in step 56 based on the following equation:

$$\Delta E_{KE} = \frac{1}{2} \times m \times (v_i^2 - v_{i-1}^2).$$

If the change in potential energy is to be considered, it is calculated in step 58 based on the following equation:

$$\Delta E_{PE} = m \times g \times [h_i - h_{i-1}].$$

Alternatively, the change in the vehicle inclination angle is sensed by an HBM Type B 12/200 accelerometer to provide a vehicle inclination signal 20. The inclinometer provides the angle of attack of the vehicle with respect to a horizontal. The change in potential energy is then calculated based on the following equation:

$$\Delta E_{PE} = m \times g \times v_{avg} \times \Delta t \times \sin(\emptyset)$$

where $\emptyset$ is the angle of attack (pitch) of the vehicle with respect to a horizontal.

Next, as shown in step 60, the effective fuel economy, MPG$_{eff}$, is calculated as follows:

$$MPG_{eff} = \frac{v_{avg} \times D \times \Delta t \times \Delta H_R}{E_f - \Delta E_{KE} - \Delta E_{PE}}.$$

The current parameter values, fpc$_i$, $v_i$, and $h_i$, are then stored in the memory 28 of the microcontroller 22 as fpc$_{i-1}$, $v_{i-1}$, and $h_{i-1}$, respectively. These current parameters then serve as the initial parameters when calculating the MPG$_{eff}$ over the next or subsequent interval of time.

And finally, as shown in step 64, the effective fuel economy is displayed to the operator of the vehicle. Steps 48–62 are repeated during the operation of the vehicle in order to provide continually updated information to the operator of the vehicle. It should be noted that the sequence of steps of the present invention do not have to be performed in the order shown in FIGS. 2 and 3.

Figure 4:
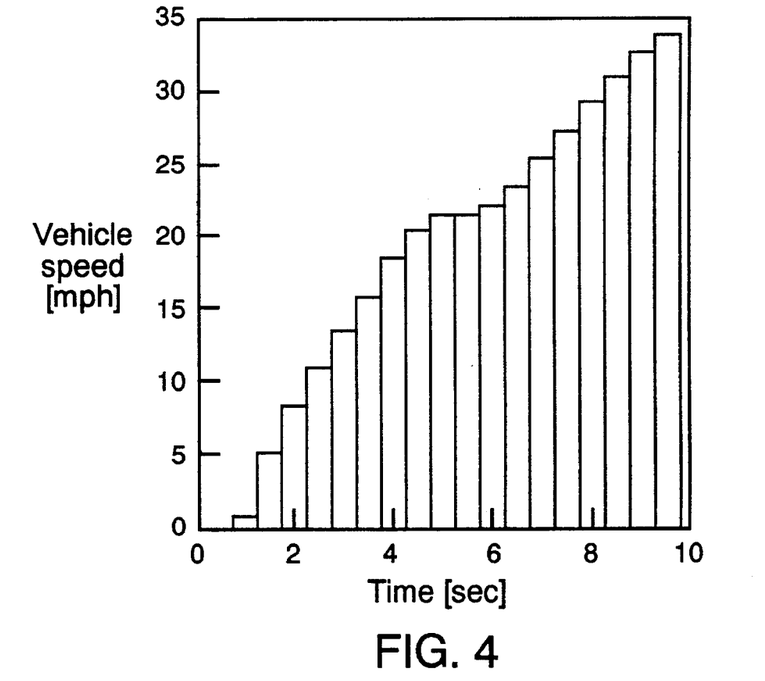
FIG. 4 is a graph illustrating average vehicle speed at ½ second intervals during a moderate acceleration from a standstill.
Figure 5:
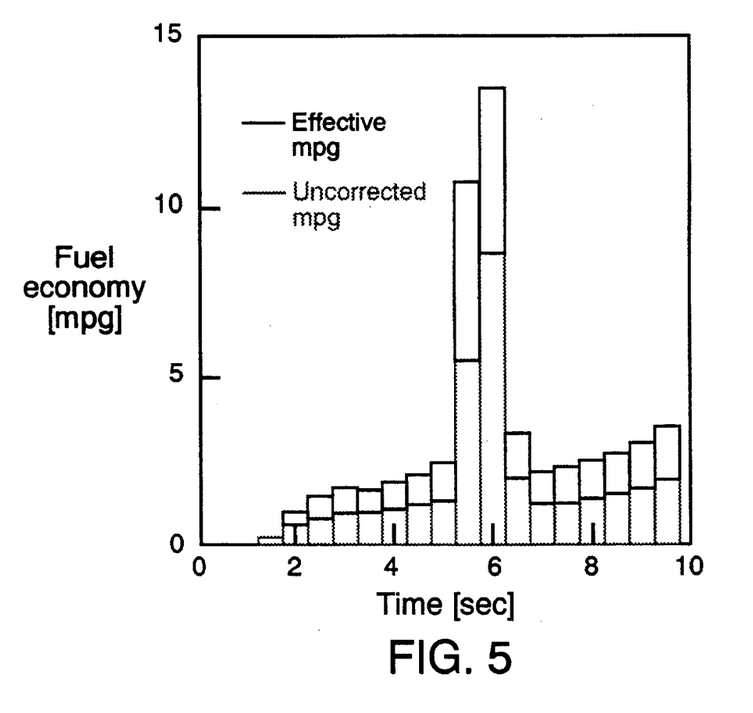
FIG. 5 is a graph illustrating the difference between uncorrected fuel economy and the present invention during a moderate acceleration.
Figure 6:
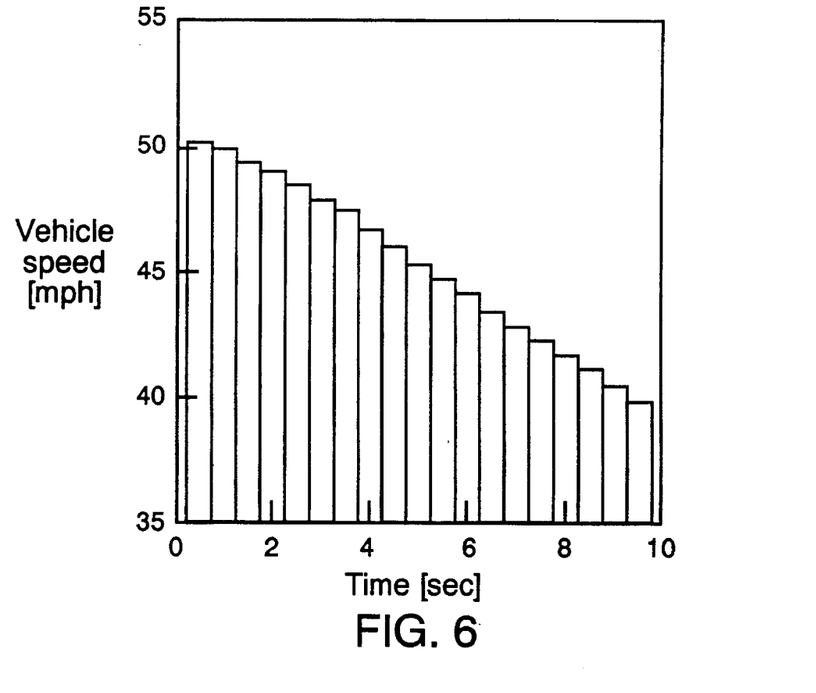
FIG. 6 is a graph illustrating average vehicle speed at ½ second intervals during a coast-down.

Turning now to FIGS. 4–7 of the drawings, quantitative aspects of the present method and system are depicted. Acceleration and coast-down data were collected on a particular make and model vehicle, as shown in FIGS. 4 and 6. FIG. 4 is a graph illustrating the average vehicle speed at ½ second intervals during a moderate acceleration from a standstill. Fuel economy was then calculated using the prior art method which considers only vehicle speed and the mass flow rate of fuel. Fuel economy was also calculated using the present invention. Measurements were taken on a level surface; therefore, the change in potential energy was zero.

FIG. 5 illustrates the difference in calculating fuel economy using the prior art method and calculating fuel economy using the present invention during the moderate acceleration. The present invention provides a more representative reading to the operator of the vehicle.

FIG. 6 is a graph illustrating the average vehicle speed at ½ speed intervals during a coast-down. The aforementioned vehicle used to collect these data had a deceleration fuel shutoff feature. When the deceleration fuel shutoff is activated, no fuel is flowing. Using the prior art method to calculate fuel economy leads to infinity. Since the display 32 is normally limited to a maximum output at 99, that is what is displayed during deceleration. Calculating fuel economy using the present invention results in a high reading, however, it is a useful output.

Figure 7:
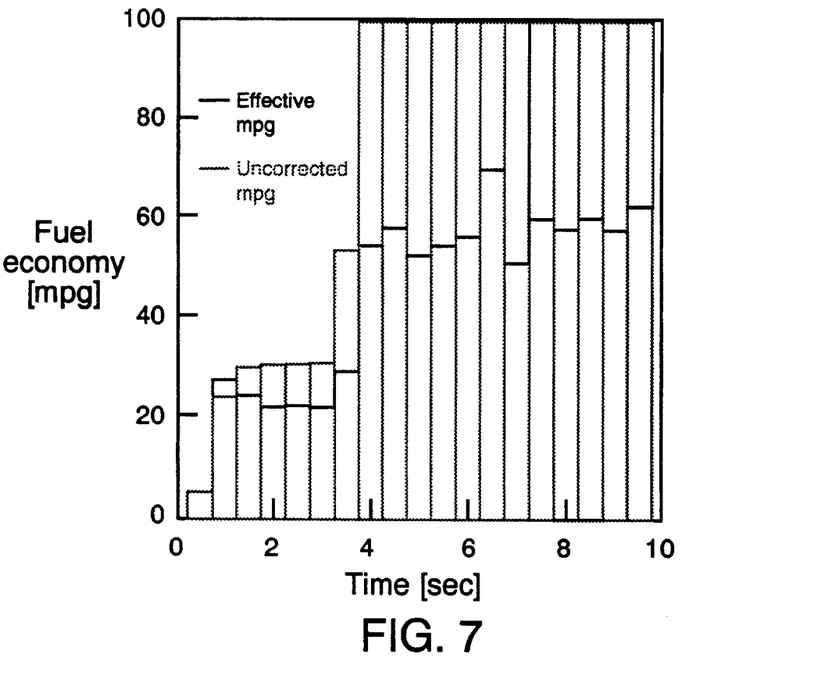
FIG. 7 is a graph illustrating the difference between uncorrected fuel economy and the present invention during a coast-down.

FIG. 7 illustrates the difference between the two methods. Again, the present invention provides a more meaningful reading to the operation of the vehicle.

While the best modes for carrying out the invention have been described in detail, those familiar with the art to which this invention relates will recognize various alternative designs and embodiments for practicing the invention as defined by the following claims.

We claim:

1. A method for determining and displaying on a visual display the effective fuel economy ($MPG_{eff}$) of a fuel consuming engine during a time interval $\Delta_t$ in a vehicle, the method comprising:

providing a vehicle having a mass and said fuel consuming engine;

determining an enthalpy of reaction ($\Delta H_R$) of the fuel, which represents the energy released per unit mass by combustion following actual injection of fuel into the engine;

determining an amount of chemical energy ($E_f$) contained in the fuel based on the enthalpy of reaction of the fuel;

sensing a vehicle speed at predetermined periods of time during the time interval and generating corresponding velocity signals ($v_i$, $v_{i-1}$);

determining a change in kinetic energy ($\Delta E_{KE}$) of the vehicle during the time interval based solely on the velocity signals and the mass of the vehicle;

determining a change in potential energy ($\Delta E_{PE}$) of the vehicle;

determining the effective fuel economy of the vehicle based on the chemical energy, the change in kinetic energy and the change in potential energy;

generating an electrical signal for receipt by the visual display corresponding to the determined effective fuel economy; and displaying the determined effective fuel economy.

2. The method of claim 1, wherein the mass of the vehicle is a preselected value.

3. The method of claim 1, wherein the step of determining $\Delta H_R$ comprises:

determining a mass fraction of alcohol contained in the fuel ($X_{alcohol}$);

determining an enthalpy of reaction of alcohol ($\Delta H_{R, alcohol}$);

determining an enthalpy of reaction of gasoline ($\Delta H_{R, gasoline}$); and determining $\Delta H_R$ in accordance with the formula:

$$\Delta H_R = \{X_{alcohol} \times \Delta H_{R, alcohol}\} + \{(1 - X_{alcohol}) \times \Delta H_{R, gasoline}\}.$$

4. The method of claim 1 wherein the step of determining the change in the potential energy includes the step of determining a pitch of the vehicle ($\emptyset$) with respect to a horizontal and wherein the change in potential energy is determined in accordance with the formula:

$$\Delta E_{PE} = m \times g \times v_{avg} \times \Delta_t \times \sin \emptyset,$$

where g is acceleration due to gravity and $v_{avg}$ is an average vehicle speed during the time interval.

5. The method as recited in claim 1 wherein the step of determining the amount of chemical energy contained in the fuel includes the step of determining a mass flow rate ($m_f$) of the fuel and wherein the amount of chemical energy is determined in accordance with the formula:

$$E_f = m_f \times \Delta H_R.$$

6. The method as recited in claim 5 wherein the vehicle includes fuel injector values which open and close to allow fuel to flow into the engine, and wherein the step of determining the mass flow rate of fuel includes the step of determining a duration of time when the fuel injector values are opened.

7. The method as recited in claim 1 wherein the step of determining the change in the potential energy includes the step of determining a change in height ($h_i - h_{i-1}$) of the vehicle above a datum plane during the time interval and wherein the change in potential energy is determined in accordance with the formula:

$$\Delta E_{PE} = m \times g \times (h_i - h_{i-1}),$$

where g is acceleration due to gravity.

8. The method as recited in claim 1 further comprising the step of determining a density (D) of the fuel, and wherein the effective fuel economy is determined in accordance with the formula:

$$MPG_{eff} = \frac{v_{avg} \times D \times \Delta_t \times \Delta H_R}{E_f - \Delta E_{KE} - \Delta E_{PE}}$$

where $v_{avg}$ is an average vehicle speed during the time interval.

9. The method as recited in claim 1 wherein the step of providing the vehicle includes the step of sensing the mass of the vehicle.

10. For use with a vehicle having a mass and a fuel consuming engine, a system for determining and displaying the effective fuel economy of the fuel consuming engine during a time interval, the system comprising:

means for determining an enthalpy of reaction ($\Delta H_R$) of the fuel, which represents the energy released per unit mass by combustion following actual injection of fuel into the engine;

means for determining an amount of chemical energy contained in the fuel based on the enthalpy of reaction of fuel;

a first sensor for sensing a vehicle speed at predetermined periods of time during the time interval and for generating corresponding velocity signals;

means for determining a change in kinetic energy of the vehicle during the time interval based solely on the velocity signals and the mass of the vehicle;

means for determining a change in potential energy of the vehicle;

means for determining the effective fuel economy based on the amount of chemical energy, the change in kinetic energy and the change in potential energy;

means for generating an electrical signal corresponding to the effective fuel economy; and a display for displaying the effective fuel economy upon receipt of the electrical signal.

11. The system as recited in claim 10 wherein the means for determining the change in potential energy includes means for determining a pitch of the vehicle with respect to a horizontal.

12. The system as recited in claim 11 wherein the means for determining the pitch of the vehicle is an inclinometer.

13. The system as recited in claim 10 wherein the means for determining the change in the kinetic energy includes means for determining a mass of the vehicle.

14. The system as recited in claim 13 wherein the means for determining the mass of the vehicle is a pressure transducer.

15. The system as recited in claim 10 wherein the enthalpy of reaction of the fuel is a preselected value.

16. The system as recited in claim 10 wherein the means for determining the enthalpy of reaction of the fuel comprises:

means for determining a mass fraction of alcohol contained in the fuel;

means for determining an enthalpy of reaction of alcohol; and means for determining an enthalpy of reaction of gasoline.

17. The system as recited in claim 10 wherein the means for determining the amount of chemical energy includes means for determining a mass flow rate of the fuel.

18. The system as recited in claim 10 wherein the means for determining the change in potential energy includes means for determining a change in height of the vehicle above a datum plane during the time interval.

19. The system as recited in claim 18 wherein the means for determining the change in height of the vehicle is an altimeter.

20. The system as recited in claim 18 wherein the means for determining the change in height of the vehicle is a navigation device.

* * * * *